United States Patent [19]

Hori et al.

[11] Patent Number: 5,449,236
[45] Date of Patent: Sep. 12, 1995

[54] FLUID BEARING DEVICE

[75] Inventors: Nobumitsu Hori, Chiryu; Noriyasu Hayashi, Kariya, both of Japan

[73] Assignee: Toyoda Koki Kabushiki Kaisha, Kariya, Japan

[21] Appl. No.: 217,570

[22] Filed: Mar. 25, 1994

[30] Foreign Application Priority Data

Mar. 25, 1993 [JP] Japan .................................. 5-067039

[51] Int. Cl.$^6$ .......................................... F16C 32/06
[52] U.S. Cl. .................................................. 384/118
[58] Field of Search ............... 384/118, 111, 120, 114, 384/107, 399

[56] References Cited

U.S. PATENT DOCUMENTS 2,660,484 11/1953 Gerard et al. .
4,474,483 10/1984 Suzuki et al. ............... 384/118
4,672,813 6/1987 David .......................... 384/111

FOREIGN PATENT DOCUMENTS 4-249614 9/1992 Japan .

Primary Examiner—Lenard A. Footland
Attorney, Agent, or Firm—Oblon, Spivak, McClelland, Maier, & Neustadt

[57] ABSTRACT

A bearing member for rotatably supporting a rotary shaft has an internal bore which forms a bearing surface. The bearing surface is formed with a plurality of rectangular fluid pockets in a circumferential direction thereof and a land portion around the fluid pockets. A plurality of protrusions extending in an axial direction of the rotary shaft are formed in each fluid pocket to be discontinued from the land portion. Further, a supply port is formed in each fluid pocket for supplying pressurized fluid therewith. Each of the supply ports is positioned at the upstream side in the rotational direction of the rotary shaft.

5 Claims, 5 Drawing Sheets

FLUID BEARING DEVICE

BACKGROUND OF THE INVENTION

1. Field of the Invention

This invention relates to a fluid bearing device for supporting a rotary shaft such as a spindle of a machine tool by means of pressurized fluid.

2. Prior Art of the Invention

Generally, a fluid bearing device is provided in a circumferential direction thereof with a plurality of rectangular fluid pockets each of which has a supply port opening at the middle portion thereof. A rotary shaft is supported by means of pressurized fluid supplied into the fluid pockets through the supply ports. In such a fluid bearing device having the fluid pockets of the aforementioned shape, the flowing mode of the fluid within the fluid pockets is changed from laminar flow to turbulent flow as the rotational speed of the rotary shaft increases, whereby the shearing stress is increased. This causes the fluid frictional force to increase in square functional relationship with increase in the rotational speed of the rotary shaft, as indicated by the dotted line (a) of the graph in FIG. 5. Since energy loss becomes large within a high-speed rotational range of the rotary shaft, there occurs a problem that a driving motor for the rotary shaft and a cooling facility for operating fluid must be of higher capabilities, thereby resulting in larger size.

Further, in the case where the port for supplying the pressurized fluid opens at the middle portion of each fluid pocket in the circumferential direction, the pressure in each fluid pocket is high at the downstream side in the rotational direction of the rotary shaft and low at the upstream side, during the high-speed rotations of the rotary shaft. Under the condition, the pressurized fluid flows from the downstream side back to the upstream side, that is in reverse to the rotational direction of the rotary shaft, whereby the energy loss is increased.

SUMMARY OF THE INVENTION

It is therefore an object of the present invention to provide an improved fluid bearing device which can decrease fluid frictional force within a high-speed rotational range of a rotary shaft so as to raise the supporting rigidity in comparison with a conventional fluid bearing device.

Another object of the present invention is to provide an improved fluid bearing device wherein a driving motor of a higher-power for the rotary shaft and a cooling facility of a higher-capability for the operating fluid are not required for high-speed rotations of the rotary shaft.

A further object of the present invention is to provide an improved fluid bearing device capable of preventing the pressurized fluid admitted into fluid pockets from flowing in reverse to the rotational direction of the rotary shaft.

Briefly, according to the present invention, these and other objects are achieved by providing a fluid bearing device as mentioned below. A bearing member for rotatably supporting a rotary shaft has an internal bore which forms a bearing surface. The bearing surface is formed with a plurality of rectangular fluid pockets in a circumferential direction thereof and a land portion around the fluid pockets. A plurality of protrusions extending in an axial direction of the rotary shaft are formed in each fluid pocket to be discontinued from the land portion. Further, a supply port is formed in each fluid pocket for supplying pressurized fluid therewith. Each of the supply ports is positioned at the upstream side in the rotational direction of the rotary shaft.

With this configuration, the fluid frictional force is increased not in square functional relationship, but linearly in proportion to the rotational speed of the rotary shaft, as illustrated by the solid line (b) of the graph in FIG. 5. Within a low-speed rotational range of the rotary shaft, the fluid frictional force is higher than that of the conventional fluid bearing device since the area of the bearing surface facing the outer surface of the rotary shaft is increased by the sum of the top surfaces of the protrusions formed in the fluid pockets. However, within a high-speed rotational range, the fluid frictional force due to the turbulent flows which increase with increase in the rotational speed of the rotary shaft is weakened by the protrusions, so that the total fluid frictional force becomes smaller than that of the conventional fluid bearing device. Further, each of the fluid pockets is provided with the port for admitting the pressurized fluid at the upstream side in the rotational direction of the rotary shaft. This advantageously results in reducing the energy loss which is caused by the pressurized fluid flowing in reverse to the rotational direction of the rotary shaft.

In another aspect of the present invention, the protrusions are formed to make the clearance between the outer surface of the rotary shaft and the top surfaces of the protrusions larger than that between the outer surface of the rotary shaft and the land portion, to the extent that the laminar flow of the operating fluid is maintained. This further makes the shearing stress caused by the protrusions smaller than that caused by the land portion, resulting in efficient reduction of the fluid frictional force.

BRIEF DESCRIPTION OF THE ACCOMPANYING DRAWINGS

Various other objects, features and many of the attendant advantages of the present invention will be readily appreciated as the same becomes better understood by reference to the following detailed description of the preferred embodiments when considered in connection with the accompanying drawings, in which.

Figure 5:
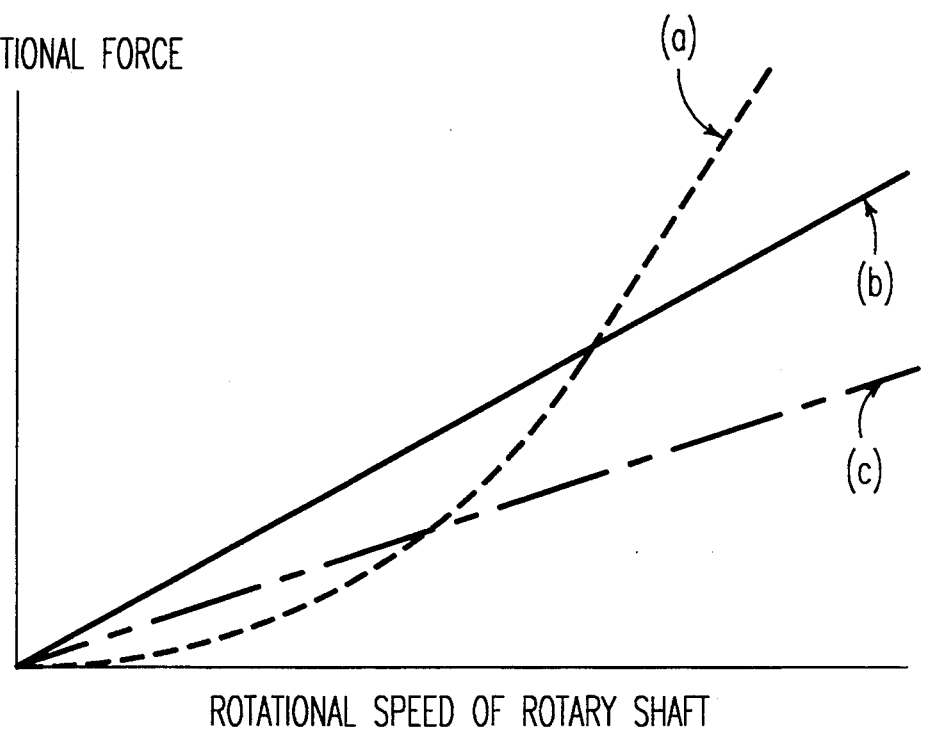
Figure 6:
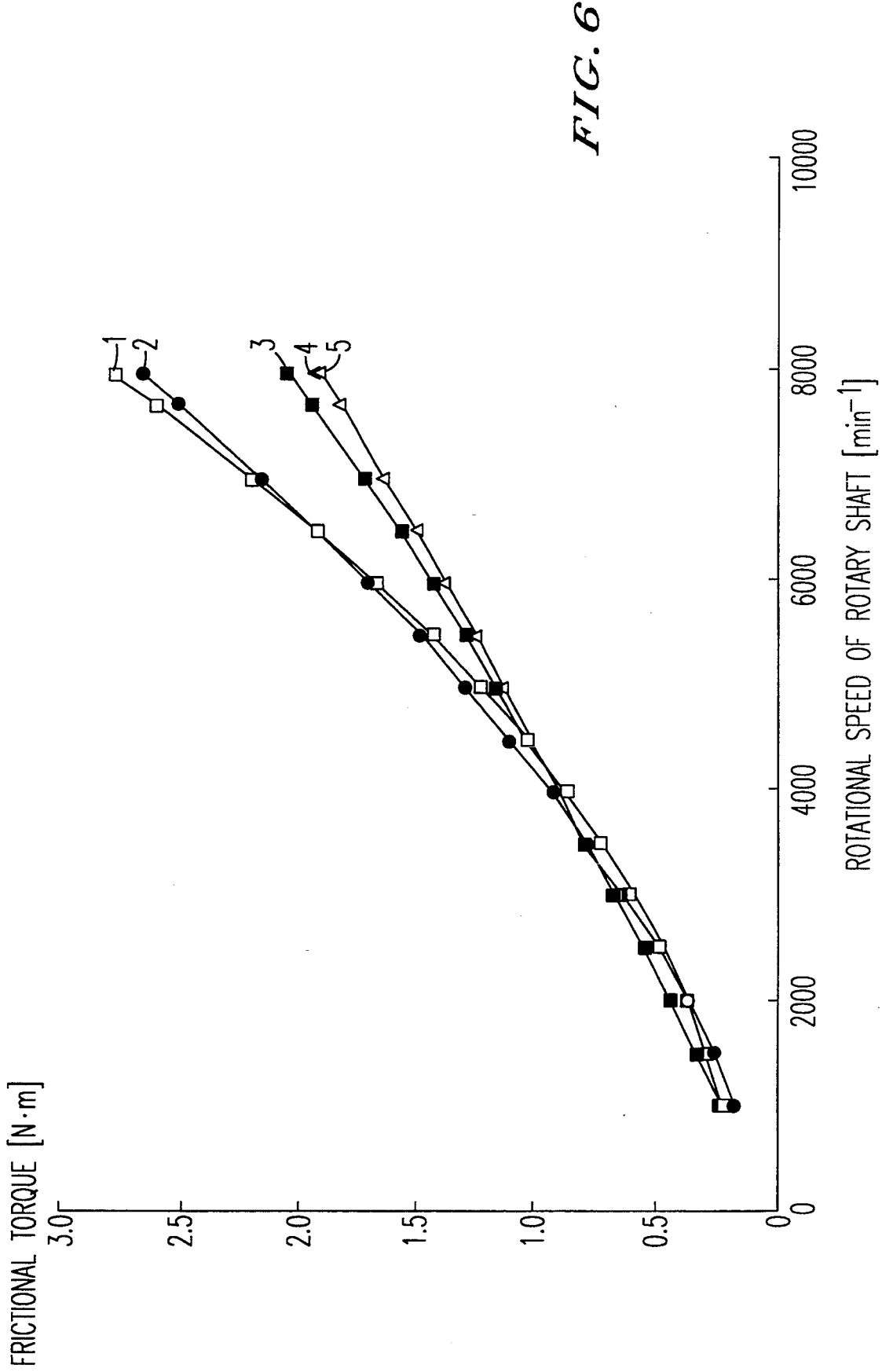

FIG. 5 is a graph showing the relationships between the rotational speed of a rotary shaft and fluid frictional force in fluid bearing devices according to the prior art and first and second embodiments; and FIG. 6 is a graph showing the relationships between the rotational speed of the rotary shaft and the frictional torque with the variations in the ratio of the height of protrusions to the distance between two adjacent protrusions.

DETAILED DESCRIPTION OF PREFERRED EMBODIMENT

Figure 1:
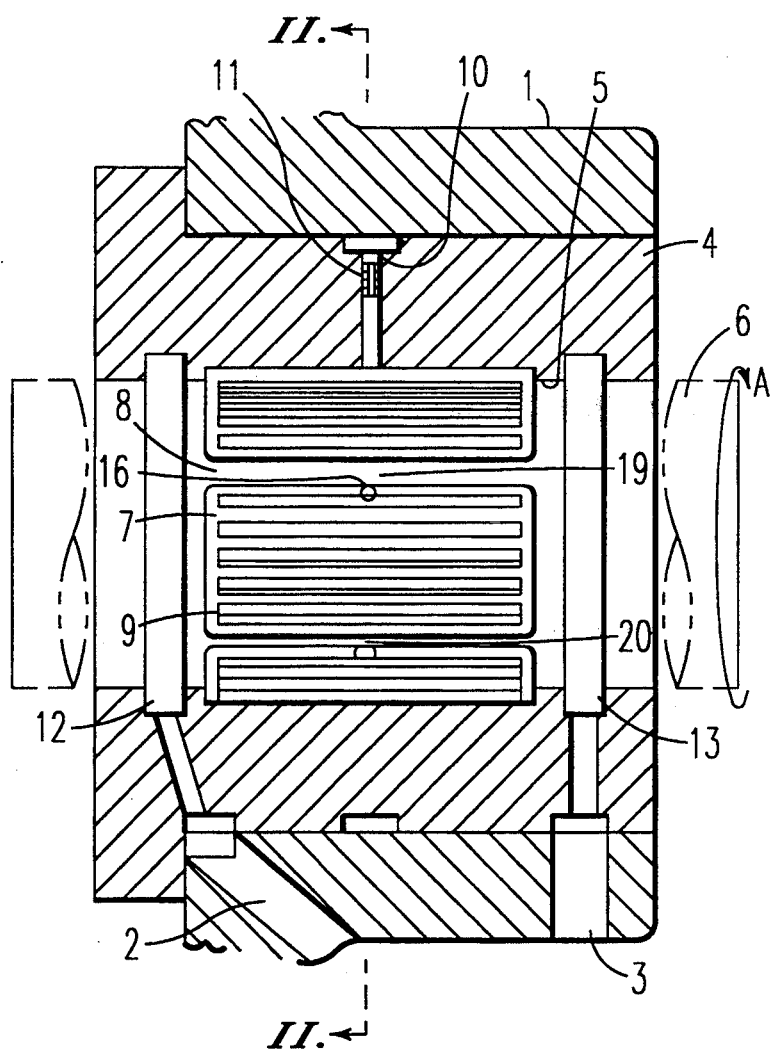
FIG. 1 is a sectional view of a fluid bearing device according to a first embodiment of the present invention.
Figure 2:
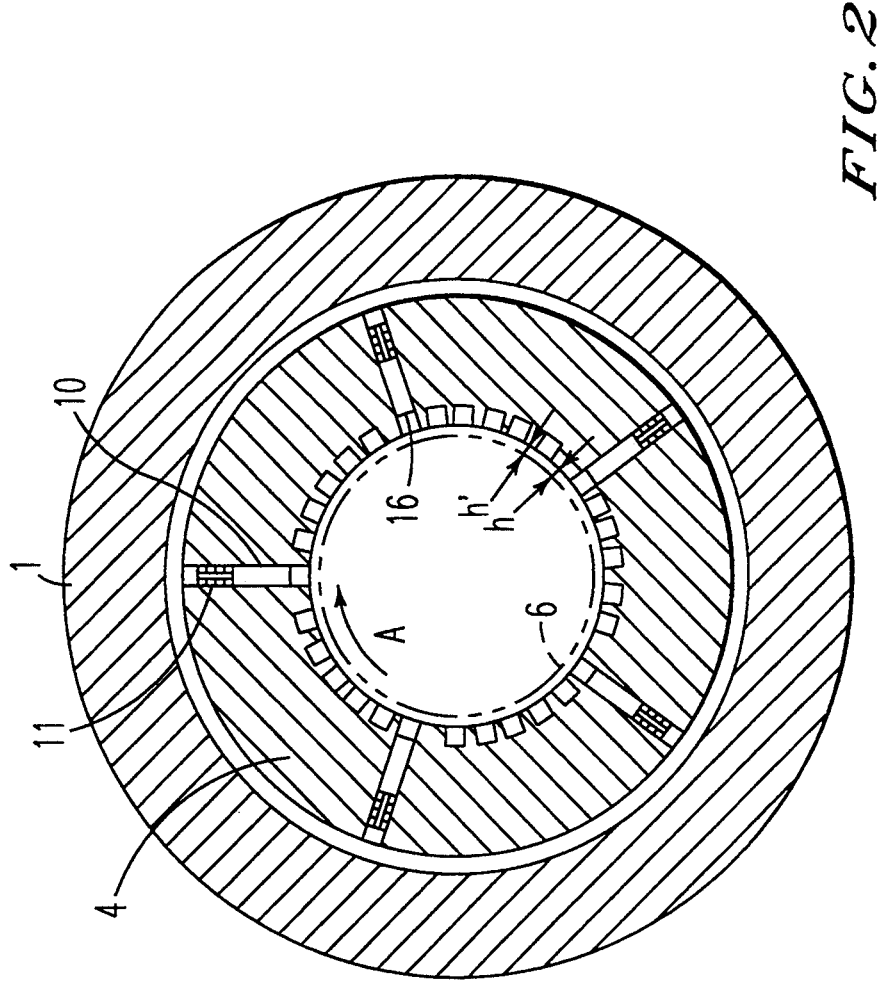
FIG. 2 is a cross-sectional view taken along line II—II in FIG. 1.

A preferred embodiment of the present invention will now be described with reference to the drawings. Referring to FIGS. 1 and 2, a bearing member 4 having a bearing surface 5 is fixed to a bearing housing 1. The bearing surface 5 supports a rotary shaft 6 rotatably in the direction shown by the arrow A. The bearing surface 5 is formed with a plurality (five in this particular instance) of rectangular fluid pockets 7 and a land portion 8 around the fluid pockets 7. The fluid pockets 7 are circumferentially arranged at the regular angular intervals. Annular exhaust grooves 12 and 13 are formed at the axial opposite sides of the fluid pockets 7 and respectively communicate to exhaust passages 2 and 3 formed in the lower portion of the bearing housing 1 so as to discharge fluid to a reservoir (not shown). The bearing member 4 is further provided with supply passages 10 which communicate through throttle elements 11 to pressurized fluid supply ports 16 opening at the fluid pockets 7, respectively. Each of the supply ports 16 is positioned at the middle portion in the axial direction and at the upstream side 19 in the rotational direction of the rotary shaft 6, as shown in detail in FIG. 3. Further, each of the fluid pockets 7 has formed therein a plurality of protrusions 9 extending in the axial direction of the rotary shaft 6 and discontinued from the land portion 8. In the first embodiment of the present invention, the clearance between the outer surface of the rotary shaft 6 and the top surfaces of the protrusions 9 is made equal to that between the outer surface of the rotary shaft 6 and the land portion 8.

The operation of the embodiment described above will be described hereinafter. The pressurized fluid is supplied into the supply passages 10 from a supply pump (not shown) and is admitted into the fluid pockets 7 through the throttle elements 11 and the supply ports 16. The pressurized fluid then passes through a ladder-shape channel defined between the land portion 8 and the protrusions 9 to be filled in the whole area of each fluid pocket 7. Thereafter, the pressurized fluid passes through the clearance formed between the outer surface of the rotary shaft 6 and the land portion 8 and is exhausted to a reservoir (not shown) through the annular exhaust grooves 12, 13 and the exhaust passages 2, 3. During this operation, a hydrostatic pressure is generated in each fluid pocket 7 because of a flow resistance which depends primarily upon the clearance between the outer surface of the rotary shaft 6 and the land portion 8 and somewhat upon the clearance between the outer surface of the rotary shaft 6 and the top surfaces of the protrusions 9. The rotary shaft 6 is rotatably supported by means of such a hydrostatic pressure.

With this configuration, the fluid frictional force increases linearly in proportion to the increase in the rotational speed of the rotary shaft 6, as illustrated by the solid line (b) of the graph in FIG. 5. Within a low-speed rotational range of the rotary shaft 6, the fluid frictional force is higher than that of the conventional fluid bearing device since the area supporting the rotary shaft 6 is increased by the provision of the protrusions 9 in each fluid pocket 7. However, within a high-speed rotational range, the fluid frictional force is reduced because the protrusions 9 serve to decrease the turbulent flows which are liable to be increased during the high-speed rotations. Therefore, the total fluid frictional force becomes smaller than that of the conventional fluid bearing device, during the high-speed rotations of the rotary shaft 6. As a result, the supporting rigidity of the fluid bearing device during the high-speed rotations of the rotary shaft 6 can be heightened, and there is neither required a high-power driving motor for rotating the rotary shaft 6 nor required a larger-capability cooling facility for the operating fluid.

Figure 3:
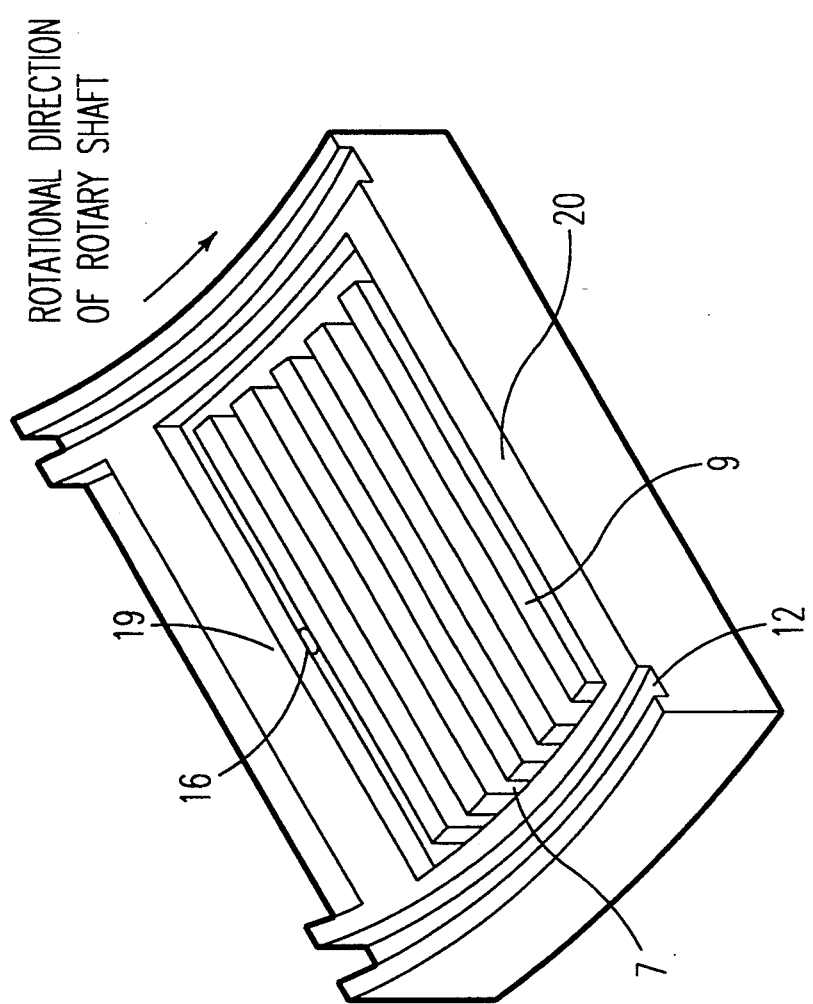
FIG. 3 is a fragmentary perspective view of a bearing surface of the fluid bearing device shown in FIG. 1.

When the rotary shaft 6 is rotated in the direction indicated by the arrow in FIG. 3, the pressurized fluid supplied to the supply ports 16 is likely to be rotated with the outer surface of the rotary shaft 6. The pressurized fluid is then drawn between the land portion 8 and the rotary shaft 6, whereby a slight dynamic pressure is also generated.

Further, in the conventional fluid bearing device, the pressure is increased at the downstream side in the rotational direction of the rotary shaft 6, but decreased at the upstream side. In the present invention, however, the pressurized fluid supplying port 16 in each fluid pocket 7 is arranged at the upstream side in the rotational direction of the rotary shaft 6. Such an arrangement of each supply port 16 can reduce the energy loss which, as is the case of the conventional fluid bearing device, is caused by the pressurized fluid flowing in reverse to the rotational direction of the rotary shaft 6.

Figure 4:
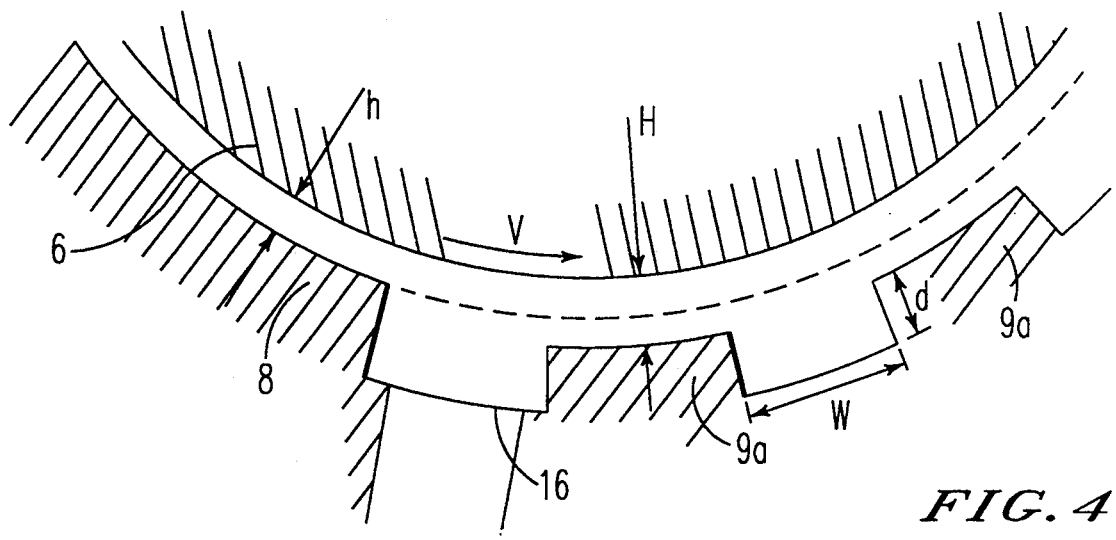
FIG. 4 is an enlarged fragmentary sectional view of a fluid bearing device according to a second embodiment of the present invention.

A second embodiment of the present invention will now be described with reference to FIG. 4. The protrusions 9a are formed to make the clearance between the outer surface of the rotary shaft 6 and the top surfaces of the protrusions 9a larger than that between the outer surface of the rotary shaft 6 and the land portion 8, to the extent that the laminar flows of the operating fluid can be maintained. Assuming that the surface velocity of the rotary shaft 6 is V, the clearance between the outer surface of the rotary shaft 6 and the land portion 8 is h, the clearance between the outer surface of the rotary shaft 6 and the top surfaces of the protrusions 9a is H and the viscosity of the operating fluid is $\mu$, then the shearing stresses $\tau L$ and $\tau P$ caused by the land portion 8 and the protrusions 9a are expressed by the following equations, respectively.

$$\tau L = \mu \cdot V/h$$

$$\tau P = \mu \cdot V/H$$

Since the clearance H is larger than the clearance h, the shearing stress $\tau P$ becomes small than the shearing stress $\tau L$. As illustrated by the chain line (c) of the graph in FIG. 5, the fluid bearing device of the second embodiment can reduce the shearing stress caused by the protrusions 9a rather than that caused by those 9 in the first embodiment, whereby the fluid frictional force can be further decreased.

FIG. 6 shows the relationships between the rotational speed of the rotary shaft 6 and the frictional torque with the variations in the ratio of the height (d) of the protrusions 9a to the distance (w) between two adjacent protrusions 9a. The curves ①, ③, ④ and ⑤ represent such relationships where the values of d/w are set to 0.75, 0.188, 0.283 and 0.375, respectively. On the other hand, the curve ② represents the relationship therebetween in the conventional fluid bearing device which is not formed in each fluid pocket with those protrusions described above. The viscosity of the operating fluid used in the experiment is 0.001 Pa.s. In the case where the rotational speed of the rotary shaft 6 was 8000 $min^{-1}$ (i.e., 8000 rpm), the smallest frictional torque was obtained where the value of d/w was 0.375. It is therefore understood that the energy loss in the device according to the second embodiment can be decreased by about 30 persents, compared to the conventional fluid bearing device.

Preferably, in this particular embodiment, the height (d) of the protrusions 9a is selected to be 1 or 2 millimeters, and the clearace (H) is selected to satisfy the following inequality.

$$H < 1500 \cdot \gamma / V$$

where $\gamma$ represents kinematic viscosity of the fluid and V represents the surface velosity of the rotary shaft 6.

It is to be noted that either oil or water-based fluid can be used as the fluid supplied into the fluid pockets 7.

Obviously, numerous modifications and variations of the present invention are possible in light of the above teachings. It is therefore to be understood that within the scope of the appended claims, the present invention may be practiced otherwise than as specifically described herein.

What is claimed is:

1. A fluid bearing device for rotatably supporting a rotary shaft comprising:
    a bearing member having an internal bore which forms a bearing surface;
    a plurality of rectangular fluid pockets circumferentially formed on said bearing surface;
    a land portion formed around said fluid pockets;
    a plurality of protrusions formed in each of said fluid pockets and extending in an axial direction of said rotary shaft, the protrusions being discontinued from said land portion; and
    a supply port formed in each fluid pocket for supplying pressurized fluid therewith, each of the supply ports being positioned at the upstream side in the rotational direction of said rotary shaft.

2. A fluid bearing device as set forth in claim 1, wherein the clearance between the outer surface of said rotary shaft and the top surfaces of said protrusions is set to be equal to that between the outer surface of said rotary shaft and said land portion.

3. A fluid bearing device as set forth in claim 1, wherein the clearance between the outer surface of said rotary shaft and the top surfaces of said protrusions is set to be larger than that between the outer surface of said rotary shaft and said land portion.

4. A fluid bearing device as set forth in claim 1, wherein said supply port is positioned at the middle portion in the axial direction of each fluid pocket.

5. A fluid bearing device as set forth in claim 1, wherein the ratio of the height (d) of said protrusions to the distance (w) between two adjacent protrusions is chosen to be about 0.4.

* * * * *